March 31, 1959 K. SCHLESINGER ET AL 2,880,359

COLOR TELEVISION RECEIVER

Filed Sept. 14, 1953

INVENTORS
Kurt Schlesinger
Leroy Nero

BY Forman L. Mueller
Atty.

2,880,359
Patented Mar. 31, 1959

2,880,359

COLOR TELEVISION RECEIVER

Kurt Schlesinger, Maywood, and Leroy W. Nero, Chicago, Ill., assignors to Motorola, Inc., Chicago, Ill., a corporation of Illinois Application September 14, 1953, Serial No. 379,998
18 Claims. (Cl. 315—13)

The present invention relates to television receivers and more particularly to an improved control circuit for dynamically controlling the convergence or focus of the electron beams developed in the cathode ray image reproducing device of a color television receiver, or for dynamically controlling the focus of the cathode ray beam in the image reproducing device of a monochrome television receiver.

It is usual in present-day color television receivers to provide a cathode ray image reproducing device in which, for example, three separate and distinct cathode ray beams are developed and directed from different angles within the device to the fluorescent viewing screen thereof. The screen is composed of a multiplicity of segments adapted to fluoresce in each of three primary colors, and the tube is constructed so that each beam scans only those segments corresponding to the color represented by that particular beam. A perforated disc or plate, or a grid-like structure, is usually placed between the beams and the fluorescent screen and the beams are directed through apertures in the plate onto the fluorescent screen. The tube is constructed so that all the beams pass in unison through each of the apertures and are scanned from one aperture to another as they are swept in the line and field direction across the screen. It is important, therefore, that the beams be controlled to converge in the plane of the apertured disc and that such convergence be maintained throughout the entire line and field sweep of the beams.

It has been found desirable to provide a static and a dynamic convergence control for the beams in the image reproducing device described above in order that proper convergence may be obtained throughout the entire sweep. For this purpose, an electrostatic convergence control electrode is incorporated within the reproducing device and a static convergence voltage is impressed on the electrode to provide substantially the proper convergence for the beams in the plane of the apertured disc. In addition to this static convergence voltage, a dynamic convergence signal is also impressed on the electrode which varies throughout each line deflection cycle in a predetermined manner so that proper registry or convergence of the beams may be maintained throughout such line deflection cycles. It is also desirable to impress a second dynamic convergence control signal on the convergence control electrode which varies throughout each field deflection cycle in a predetermined manner so that proper convergence of the beams can also be maintained throughout such field deflection cycles.

It has been found that the line and field dynamic convergence control signals should have an approximate parabolic wave shape if they are to perform properly their dynamic convergence function. The dynamic convergence control signals obviously must have the same frequency as the corresponding deflection signals to repeat their function from line to line and from field to field, Moreover, each cycle of the respective control signals must begin and end during the line and field retrace intervals. Therefore, the line and field dynamic convergence control signals must be respectively in phase with the line and field synchronizing pulses of the received television signal.

The field dynamic convergence control signal is usually obtained by deriving the sawtooth deflection signal from the field sweep system; integrating this signal to produce a control signal having a parabolic wave shape; and then amplifying the control signal to produce a field dynamic convergence control signal of the desired amplitude, phase and frequency to perform its dynamic convergence function. Due to the fact that the line scanning frequency is much higher than the field scanning frequency (15,750 cycles per second as compared with 60 cycles per second), it has been found appropriate to utilize resonant networks, excited by the line synchronizing pulses or pulses corresponding thereto, to derive the line dynamic convergence control signal. When a resonant network is used, the signal produced thereby in the prior art arrangements is in fact a sine wave. However, the portions of the sine wave occurring during the line trace intervals have been found, under some circumstances, to have a wave shape capable of producing satisfactory dynamic line convergence of the cathode ray beams.

It is a general object of the present invention to provide an improved network for developing a dynamic convergence control signal in a television receiver for dynamically controlling the convergence or focus of the cathode ray beams in a color image reproducing device or for dynamically controlling the focus of the cathode ray beam in a monochrome image reproducer.

Another object of the invention is to provide an improved resonant network circuit which responds to the line blanking pulses developed in the line sweep system of a television receiver to produce a line dynamic convergence control signal of the required phase, frequency and amplitude properly to perform its dynamic convergence control function.

A feature of the invention is the provision of a resonant network having a first resonant section tuned to the frequency of one of the deflection signals in a television receiver and having a second resonant section tuned to a harmonic of that frequency, the network responding to an applied pulse signal to produce a pair of sine wave signals which are combined to form a dynamic convergence control signal. The control signal so derived has a wave shape that approximates a parabola during trace intervals, so that satisfactory convergence control of the cathode ray beams in the reproducing device may be obtained therewith.

Another feature of the invention is the provision of a simple resonant network having first and second resonant sections, each tuned to the frequency of one of the deflection signals in the television receiver, the network being so connected that it produces a dynamic convergence control signal having the proper frequency, phase and wave shape to provide adequate dynamic convergence control for the cathode ray beams in the reproducing device.

Further objects, features and the attending advantages of the invention will be apparent with reference to the following specification and drawings in which.

Figures 1, 2, 3, 4:
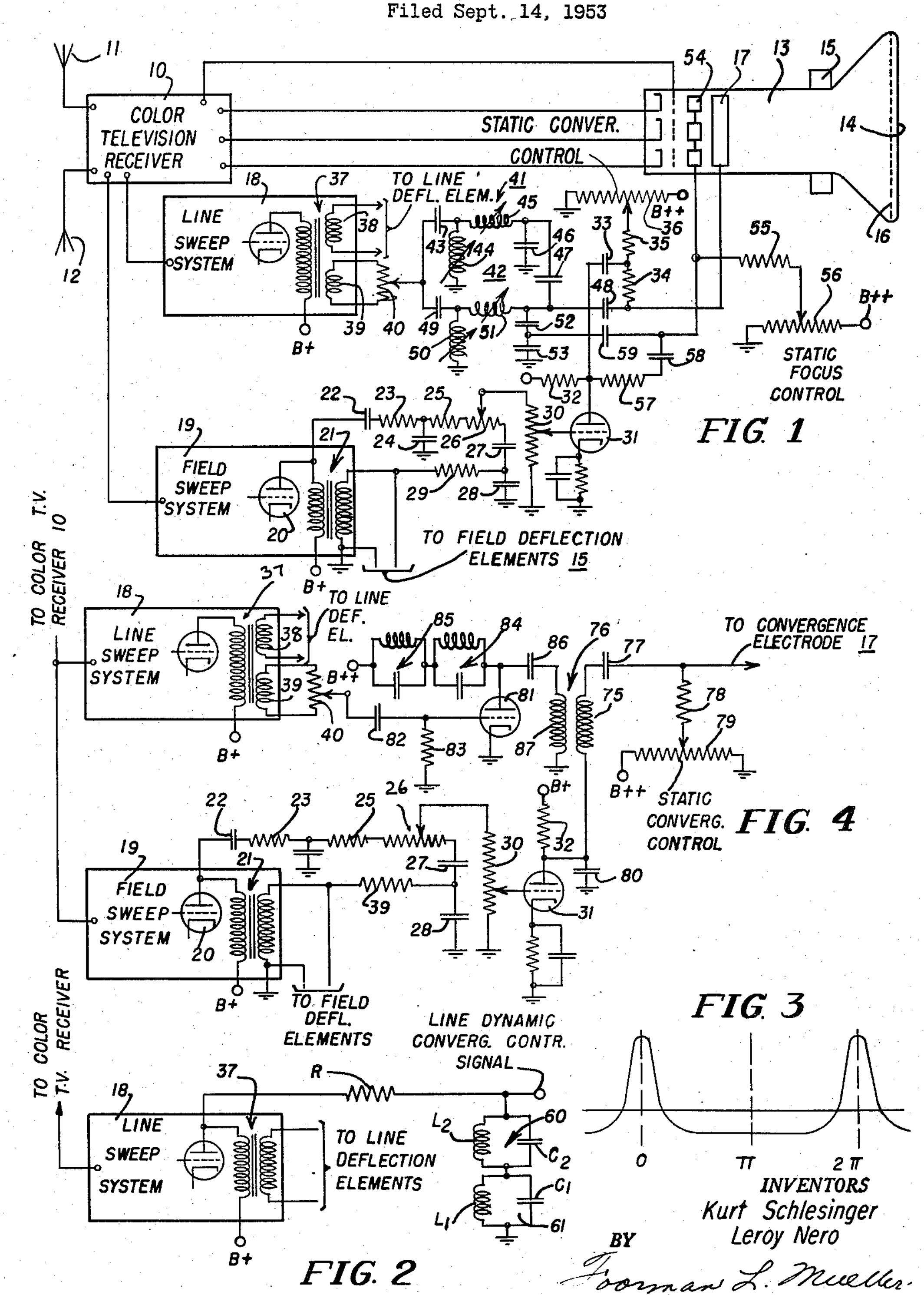
Figure 1 shows a television receiver incorporating one embodiment of the invention.
Figure 2 is a modification of the invention.
Figure 3 is a curve useful in explaining the circuit of Figure 2.
Figure 4 is a portion of a color television receiver incorporating another embodiment of the invention.

The invention provides a circuit for developing a convergence control signal in a television receiver which includes a cathode ray image reproducing tube. The reproducing tube includes means for developing at least one cathode ray beam therein, and means for controlling the convergence of such beam; and the receiver includes a sweep system for supplying to the cathode ray tube a periodic scanning signal of a selected frequency for deflecting the cathode ray beam. The convergence control circuit includes a first resonant network tuned to the frequency of the scanning signal and coupled to the sweep system for producing a first sine wave in phase with and having the frequency of the scanning signal. The control circuit also includes a second resonant network tuned to the frequency of a harmonic of the scanning signal and coupled to the sweep system for producing a second sine wave in phase with and having the frequency of the harmonic. Means is provided for combining the first and second sine waves to produce a wave approximately a parabolic wave; and further means is provided for supplying the last mentioned wave to the convergence controlling means of the image reproducing tube.

The invention also provides in such a television receiver, a convergence control circuit which includes a resonant network having an input terminal coupled to the sweep system and further having an output terminal. The resonant network includes a first series resonant section comprising a capacitor and an inductance coil series connected between the input terminal and a point of reference potential and the resonant network also includes a second series resonant section comprising an inductance coil and a capacitor series connected from the common junction of the first mentioned capacitor and inductance coil to the point of reference potential. The output terminal is coupled to the common junction of the inductance coil and capacitor in the second section. The sections are tuned to the frequency of the scanning signal, and produce a convergence control signal in phase with and having the frequency of the scanning signal and of sufficient amplitude properly to perform its dynamic convergence function. Finally, means is coupled to the output terminal for supplying the convergence control signal to the convergence controlling means of the image reproducing tube.

The system illustrated in Figure 1 includes a unit 10 which contains the various stages of a color television receiver. Unit 10 has input terminals connected to an appropriate antenna 11, 12 and has output terminals connected to the cathodes and control electrodes of a cathode ray color image reproducing device 13.

The color television receiver unit 10 may include, for example, all the stages necessary for demodulating a received color television signal and for supplying its various brightness and color components to the image reproducing device 13. A more detailed description of the receiver itself is deemed to be unnecessary since the present invention is concerned with a convergence control network and may be applied to any color television receiver. Moreover, the control network of the invention may be applied to a monochrome receiver for controlling the focus of the cathode ray beam in the cathode ray image reproducing device of such a receiver.

The cathode ray image reproducing device 13 develops, as previously noted, three separate and distinct cathode ray beams which are directed to screen 14 at different angles and which are swept in a line and field direction across the screen by suitable line and field deflection elements 15. An apertured disc or plate 16 is positioned adjacent screen 14 and, as discussed previously herein, it is essential for proper operation of the device that the three cathode ray beams be precisely converged in the plane of the disc throughout each line and field scanning cycle. For this purpose, a convergence control electrode 17 is included in the device to which static and dynamic convergence control signals are applied, in a manner to be described, to establish an electrostatic convergence field within the device.

The line and field sweep systems of the color television receiver 10 are designated as separate units 18 and 19. The field sweep system includes a usual output stage incorporating an amplifier or electron discharge device 20 coupled in well known manner to the primary of an output transformer 21 whose secondary is coupled to the field deflection elements 15 of reproducing device 13. The anode of device 20 is coupled through a capacitor 22 to a first integrating network including a resistor 23 and a capacitor 24 coupling the resistor to ground. The junction of resistor 23 and capacitor 24 is connected to a second integrating network including a pair of series resistors 25, 26 and a pair of series capacitors 27, 28 coupling resistor 26 to ground. One side of the secondary of transformer 21 is connected to ground and the other is connected through a resistor 29 to the junction of capacitors 27, 28. Resistor 26 has a movable tap which is connected to ground through a resistor 30. Resistor 30 has a movable tap connected to the control electrode of an electron discharge device 31. The anode of device 31 is connected to the positive terminals B++ of a uni-directional potential source through a load resistor 32, and the anode is coupled through a capacitor 33 to the common junction of a pair of series resistors 34 and 35. Resistor 35 is connected to the variable tap of a potentiometer 36, the potentiometer being connected between the positive terminal B++ and ground. The side of resistor 34 remote from the resistor 35 is connected to the convergence control electrode 17 of reproducing device 13.

A static convergence control potential is supplied to the convergence control electrode through resistors 35 and 34 from the potentiometer 36, and the potentiometer may be adjusted so that the cathode ray beams in device 13 are properly converged in the plane of disc 16 at the mid-point of their sweep. The beams are also controlled dynamically by the circuit described above to maintain them in proper convergence throughout each field deflection cycle. This circuit operates in the following manner.

The output amplifier 20 of the field sweep system develops a peaked sawtooth wave and this wave is integrated by the circuit 23, 24 to remove the peaks. The resulting unpeaked sawtooth wave across capacitor 24 is again integrated by the circuit 25, 26, 27, 28 to produce a parabolic wave across capacitors 27, 28. A further peaked sawtooth wave is derived from the secondary winding of transformer 21 of the same frequency as the peaked sawtooth wave referred to above but of opposite polarity. The further peaked sawtooth wave is integrated by circuit 29, 28 to produce across capacitor 28, an unpeaked sawtooth wave of the same frequency but of opposite polarity to the unpeaked sawtooth wave referred to above.

When the tap on resistor 26 is moved to the left of the drawing, the parabolic wave derived thereby and appearing across resistor 30 is distorted by the unpeaked sawtooth wave across capacitor 24 to produce a controllable "tilt" in the parabolic wave in one direction. On the other hand, when the tap is moved to the right of the drawing, the parabolic wave across resistor 30 is distorted by the opposite polarity unpeaked sawtooth wave across capacitor 28 to produce a controllable "tilt" in the parabolic wave in the opposite direction.

In this manner, a parabolic dynamic convergence control signal of controllable wave shape is applied to the control electrode of device 31, and the amplitude of this signal may also be controlled by adjustment of the movable tap on resistor 30. This control signal is amplified and phase inverted by device 31 and supplied to the convergence control electrode 17 of device 13 through capacitor 33 and resistor 34. The wave shape and amplitude of the control signal supplied to the electrode 13 may be controlled as described above to maintain the cathode ray beams in device 13 properly converged throughout each field deflection cycle.

It has also been found desirable to supply a second dynamic convergence control signal to the convergence control electrode 17 to control the convergence of the cathode ray beams throughout each line deflection cycle, and this is achieved in the following manner. Line sweep system 18 includes an output transformer 37 which includes a secondary winding 38 coupled to the line deflection elements 15 of reproducing device 13 and supplies the line deflection signal to these elements.

Transformer 37 also includes an auxiliary winding 39 coupled to winding 38 and shunted by a resistor 40. Resistor 40 has a variable tap connected to the input terminal of a first resonant network 41 and to the input terminal of a second resonant network 42. Resonant network 41 includes a first series resonant section comprising a capacitor 43 and series-connected inductance coil 44 coupled between the input terminal of resonant network 41 and a point of reference potential and ground. Resonant network 41 also includes a second series resonant section comprising an inductance coil 45 and capacitor 46 connected from the common junction of capacitor 43 and inductance coil 44 to ground. The common junction of inductance coil 45 and capacitor 46 is coupled to the convergence control electrode 17 through a capacitor 47 and a capacitor 48.

Resonant network 42 includes a first series resonant section comprising a capacitor 49 and series-connected inductance coil 50 connected in that order between its input terminal and a point of reference potential or ground. Series resonant network 42 also includes a second series resonant network including an inductance coil 51 and a pair of series-connected capacitors 52 and 53 connected from the common junction of capacitor 49 and inductance coil 50 to ground. The common junction of capacitor 52 and inductance coil 51 is connected to the common junction of capacitors 47 and 48.

A series of pulses corresponding to the line blanking pulses is developed across winding 38 and these pulses are induced in winding 39 and appear across resistor 40. Series resonant section 43, 44 is tuned to the repetition frequency of these pulses and develops a sine wave thereacross having the frequency of the line deflection signal and in phase therewith. A similar sine wave is developed across inductance coil 44 in lagging phase quadrature with the sine wave across the entire series resonant section with the increased amplitude relative thereto. The sine wave appearing across inductance coil 44 is applied to series resonant section 45, 46 which is tuned to the same frequency as section 43, 44, and the section 45, 46 develops a second sine wave thereacross in phase with the sine wave across inductance coil 44. A second sine wave, therefore, is developed across capacitor 46 in leading phase quadrature with the sine wave across the entire section 45, 46 with increased amplitude relative thereto and of greatly increased amplitude with respect to the sine wave developed across the first resonant section. The sine wave appearing across capacitor 46 has the proper frequency, amplitude and phase to function as the line dynamic convergence control signal, and it is supplied to the convergence control electrode 17 through capacitors 47 and 48.

For some applications, the line dynamic convergence control signal produced by resonant network 41 alone has the required wave shape for dynamically controlling the convergence of the cathode ray beams in device 13 throughout each line deflection cycle. However, as previously noted, the ideal convergence control signal has been found to have a parabolic wave shape and this shape can be more nearly approximated by mixing the second harmonic with the sine wave produced by resonant network 41. The second harmonic is derived from the pulses across potentiometer 40 by resonant network 42. Resonant network 42 is similar to resonant network 41 and functions in the same manner with the exception that its series resonant sections 49, 50 and 51, 52, 53 are tuned to the second harmonic of the line deflection signal rather than the fundamental frequency of that signal. The sine wave signal appearing across capacitors 52 and 53 in resonant network 42 is combined with the signal appearing across capacitor 46 in network 41, and these two signals are combined to constitute a dynamic convergence control signal of a wave shape more nearly approaching a parabola than a single sine wave, the resulting line convergence control signal being applied to electrode 17 through capacitor 48.

The wave shape of the line convergence control signal can be controlled by tuning the various resonant sections of networks 41 and 42 slightly off resonance thereby to control the relative phase of the various components constituting the control signal. In this manner, the control signal can be adjusted to provide essentially perfect dynamic convergence throughout each line deflection cycle.

Reproducing device 13 also includes a series of focusing electrodes 54 for individually focusing the cathode ray beams within the device. Electrodes 54 are connected through a resistor 55 to a variable tap on a potentiometer 56, the potentiometer being connected between the positive terminal B++ and ground. The anode of discharge device 31 is coupled to the focusing electrodes 54 through a series-connected resistor 57 and capacitor 58, and the common junction of capacitors 52 and 53 is coupled to the focusing electrodes through a coupling capacitor 59.

A static focusing control voltage is supplied to the focusing electrodes from across potentiometer 56, and this control voltage may be adjusted to the desired level by the variable tap on the potentiometer. The dynamic field convergence signal developed by discharge device 31 is supplied to the focusing electrodes through capacitor 58, and the dynamic line convergence control signal developed by networks 41, 42 is supplied with reduced amplitude to the focusing electrodes through coupling capacitor 59. In this manner, the dynamic convergence signals are used not only to control the convergence of the cathode ray beams in device 13, but also to control dynamically the focus of the individual beams. It is apparent that the control network of the present invention may also be used in a monochrome television receiver to control the focus of the cathode ray beam developed in its image reproducing device.

The circuit of Figure 2 represents a modified form of the invention for deriving the line dynamic convergence control signal. In this embodiment the anode of the output amplifier of line sweep system 18 is connected through a resistor R and a pair of series-connected parallel resonant networks 60 and 61 to ground, and the convergence control signal is derived across these networks.

Figure 3 shows the desired wave form of the control signal for proper line convergence control. It is composed of two co-sine waves of the first and second harmonic of the line frequency. For this wave form, the ratio of the second harmonic to the first harmonic must be 0.25. Any other ratio fails to give the desired flatness of the trough between the peaks. The equation for the wave of Figure 3, therefore, reads:

$$Y=A\ [\cos(\Omega t)+\tfrac{1}{4}\cos(2\Omega t)] \quad (1)$$

where: $\Omega$=line frequency.

If the waveform of Equation 1 is to be formed by the circuit of Figure 2, the values of $L_2$, $C_2$ of network 60 and $L_1$, $C_1$ of network 61 must have certain values which are determined in the following manner:

Network 61 is tuned to the first harmonic of the line frequency so that $$L_1C_1\Omega^2=1 \quad (2)$$

Network 62 is tuned to the second harmonic of the line frequency so that $$L_2C_2(2\Omega)^2=1 \quad (3)$$

From Fourier analyses of a pulse train with a 14% duty cycle, we get for the ratio of the amplitudes of the first two harmonics $$\frac{a_2}{a_1}=0.9 \quad (4)$$

where:

$a_2$=amplitude of the second harmonic
$a_1$=amplitude of the first harmonic

The voltage ratios obtained across the networks 60, 61 are $$\frac{e_2}{e_1}=\frac{a_2}{a_1}\frac{Z_2Q_2}{Z_1Q_1} \quad (5)$$

where:

$Z_2=\sqrt{\frac{L_2}{C_2}}$—surge impedance of network 60

$Z_1=\sqrt{\frac{L_1}{C_1}}$—surge impedance of network 61

$Q_2$—quality factor of network 60
$Q_1$—quality factor of network 61

The ratio of Equation 5 should be .25, as previously noted. Therefore:

$$\frac{Z_1Q_1}{Z_2Q_2}=3.6 \quad (6)$$

Hence if $Q_1$ and $Q_2$ are known and the total impedance of the circuit is established, the ratios $C_1/C_2$ and $L_1/L_2$ can be determined to provide the desired wave shape for the line dynamic convergence control signal.

In a constructed embodiment of the invention, using a pulse train having a duty cycle of 14.3%, the following values were used to obtain a control signal of the wave shape of Figure 3, and these values are listed herein merely by way of example:

$L_1$=50 mh.
$L_2$=2.5 mh.
$C_1$=0.002 $\mu$fds.
$C_2$=0.01 $\mu$fds.
$Z_1$=5000 Ω
$Z_2$=500 Ω
$Q_1/Q_2$=0.4

The parabolic wave was formed to have an amplitude of ⅓ of the pulse amplitude. Therefore, to obtain a desired 1300 volt parabolic wave, a pulse of about 4000 volts is required. These are available at the anode of the output amplifier of line sweep system 18 and appropriate connection can be made thereto as shown in Figure 2.

The embodiment of Figure 4 is generally similar to that of Figure 1 and like components have been designated by like numerals. In the latter embodiment the anode of discharge device 31 is connected through the secondary winding 75 of a transformer 76 and through a coupling capacitor 77 to the convergence control electrode 17 of reproducing device 13, the convergence control electrode being connected, as before, through a resistor 78 to the variable tap on a static convergence control potentiometer 79 connected between the positive terminal B++ and ground. The anode of device 31 is also coupled to ground through a bypassing capacitor 80.

As in the previous embodiments, a static convergence control voltage is supplied to the convergence electrode by potentiometer 79, and a dynamic field convergence control signal is supplied to the convergence electrode from device 31, in this instance through secondary winding 75. In the latter embodiment, the pulses across potentiometer 40 are supplied to the control electrode of an electron discharge device 81 through a capacitor 82 the control electrode being connected to ground through a grid-leak resistor 83. The cathode of discharge device 81 is connected to ground, and the anode of this device is connected to the positive terminal B++ through a pair of series-connected parallel resonant networks 84, 85. The anode of discharge device is also coupled through a capacitor 86 to the primary winding 87 of transformer 76, the other side of the primary being connected to ground. The line pulses across potentiometer 33 are amplified in device 81 and impressed on the resonant networks 84 and 85. Resonant network 84 is tuned to the first harmonic of the pulses, and resonant network 85 is tuned to the second harmonic thereof. The parameters of these networks are determined in the manner previously discussed in conjunction with the circuit of Figure 2. In this manner, a line dynamic convergence control signal of the waveform shown in Figure 3 is produced across networks 84, 85 and this control signal is supplied to primary winding 87. The wave shape of the control signal induced in the secondary winding 75 approximates a parabolic wave having the frequency, amplitude and phase to perform its line dynamic convergence function. The latter control signal is supplied to the convergence control electrode 17 of the cathode ray image reproducing device together with the field dynamic convergence control signal and the static convergence control voltage.

The invention provides, therefore, an improved network for producing a dynamic convergence control signal having the desired wave shape frequency and phase dynamically to control the convergence or focus of the cathode ray beams developed in the image reproducing device of a television receiver.

While particular embodiments of the invention have been shown and described, modifications may be made and it is intended in the appended claims to cover all such modifications as fall within the true spirit and scope of the invention.

We claim:

1. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a first resonant network tuned to the frequency of the deflection signal and coupled to the sweep system for producing a first sine wave signal, a second resonant network tuned to a harmonic of the frequency of the deflection signal and energized by the sweep system for producing a second sine wave signal, means for regulating the first and second sine wave signals to produce a dynamic convergence control signal, and means for supplying the control signal to the convergence controlling means of the reproducing tube.

2. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a first resonant network having a pair of resonant sections individually tuned to the frequency of the deflection signal and coupled to the sweep system for producing a first sine wave signal, a second resonant network having a pair of resonant sections individually tuned to the second harmonic of the scanning signal for producing a second sine wave signal, means for combining the first and second sine wave signals to produce a dynamic convergence control signal, and means for supplying the control signal to the convergence controlling means of the reproducing tube.

3. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a resonant network having a first resonant section coupled to the sweep system for producing a first sine wave signal in response to exciting pulses from the sweep system, said network also having a second resonant section coupled to said first section for producing a second sine wave signal in harmonic relation with said first sine wave signal and of the order of 25% of the amplitude thereof, and means for utilizing said sine wave signals to supply a dynamic convergence control to the convergence controlling means of the reproducing tube.

4. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a first resonant network coupled to the sweep system for producing a first sine wave, a second resonant network coupled to the sweep system for producing a second sine wave of a frequency substantially different from the frequency of the first sine wave, means for coupling said first and second resonant networks to the convergence controlling means of the reproducing tube for energizing the same to converge the beam in accordance with scanning thereof.

5. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, an electron discharge amplifier device having an input electrode coupled to the sweep system and having an output electrode, a pair of series-connected parallel resonant networks coupled to the output electrode of said discharge device, one of said networks being tuned to the frequency of the deflection signal and the other of said networks being tuned to the frequency of a harmonic of the deflection signal, whereby a wave approximating a parabolic wave is developed at said output electrode, and means coupled to said output electrode for supplying the last mentioned wave to the convergence controlling means of the reproducing tube.

6. In a television receiver including a cathode ray image reproducing tube having means for developing at least one cathode ray beam therein and means for controlling the convergence of such beam, and a sweep system for supplying to the cathode ray tube a deflection signal of a selected frequency for scanning the cathode ray beam, a circuit for developing a convergence control signal for dynamically controlling the convergence of the cathode ray beam throughout each cycle of the deflection signal, said circuit including in combination, a pair of series-connected parallel resonant networks, one of said networks being tuned to the frequency of the deflection signal and the other of said networks being tuned to the frequency of a harmonic of the deflection signal, means for coupling said networks to said scanning system to impress thereon a series of pulses having a repetition frequency corresponding to the frequency of the aforesaid deflection signal to excite said networks and produce a convergence control signal thereacross, and means for impressing the control signal on the convergence controlling means of the reproducing tube.

7. In a television receiver including a cathode ray image reproducing tube having means for developing at least one cathode ray beam therein and a sweep system for supplying to the cathode ray tube a deflection signal of a selected frequency, a circuit for developing a convergence control signal for dynamically controlling the convergence of the cathode ray beam throughout each cycle of deflection, said circuit including a resonant network having first and second variable tuned circuit portions, said first tuned circuit portion of said resonant network being coupled to said sweep system and being tuned to said selected frequency, said second tuned circuit portion being coupled to said sweep system and being tuned to the second harmonic of said selected frequency for developing a substantially parabolic convergence control signal substantially at the selected frequency for converging the cathode ray beam.

8. In a color television receiver including a cathode ray image reproducing tube having means for developing a plurality of cathode ray beams therein, a convergence system for controlling the convergence of such beams, and a sweep system for providing to the cathode ray tube a deflection field of selected frequency for scanning the cathode ray beams; a circuit in the convergence system for developing a field component within the reproducing tube for dynamically controlling the convergence of the cathode ray beams throughout each cycle of the deflection thereof, said circuit including a resonant network for developing a control signal substantially at the selected frequency and having first and second tuned circuit portions coupled to said sweep system to be energized thereby, said first circuit portion being tuned to said selected frequency, said second circuit portion being tuned to the second harmonic of said selected frequency and said circuit including means energized by said first and second circuit portions providing the field component within the reproducing tube for dynamically controlling the convergence of the cathode ray beams therein.

9. In a color television receiver including a cathode ray image reproducing tube having means for developing a plurality of cathode ray beams therein, a convergence system for controlling the convergence of such beams, a focus system for focusing the cathode ray beams, and a sweep system for providing a deflection field of selected frequency for scanning the cathode ray beams, a circuit for developing a control signal for dynamically controlling the convergence and focus of the cathode ray beams throughout each cycle of the reflection thereof, said circuit including a resonant network for developing a control signal at the selected frequency and having first and second tuned circuit portions with said first circuit portion coupled to said sweep system and said second circuit portion being tuned to a harmonic of the selected frequency and coupled to said first circuit portion and providing a control signal to the convergence system and the focus system for dynamically controlling the convergence and focus of the cathode ray beams.

10. In a color television receiver including a cathode ray image reproducing tube having means for developing a plurality of cathode ray beams therein and means for controlling the convergence of such beams, and a sweep system for supplying to the cathode ray tube a deflection signal of a selected frequency for scanning the cathode ray beams, a circuit for developing a convergence control signal for dynamically converging the cathode ray beams throughout each cycle of the deflection signal, said circuit including in combination, an amplifier valve coupled to the sweep system and having an output element at which appears a signal of substantially the selected frequency, a resonant network including first and second tuned circuits coupled to said output element, said second tuned circuit being resonant at a frequency bearing a harmonic relation to the selected frequency, and means for coupling said resonant network to the means for controlling the convergence of the beams in the reproducing tube.

11. In a color television receiver including a cathode ray image reproducing tube having means for developing a plurality of cathode ray beam components therein and a sweep system for supplying to the cathode ray tube a horizontal deflection field of a predetermined frequency for horizontally scanning the cathode ray beam components, a circuit for developing a convergence field for dynamically converging the cathode ray beam components throughout each cycle of horizontal deflection thereof, said circuit including in combination, a resonant network coupled to the sweep system and energized thereby, said network being tuned to resonate at substantially said predetermined frequency and also at the second harmonic thereof to develop a control signal having components of said predetermined frequency and of said second harmonic thereof, and said resonant network including field developing means energizable by said control signal and associated with the cathode ray image reproducing tube for producing a field for dynamically converging at least one cathode ray beam component with respect to another beam component in accordance with the horizontal scanned position of said one beam component.

12. In a cathode ray image reproducing system including a cathode ray image reproducing tube having means for developing electron beam components therein, which beam components are adapted to be scanned within the tube, the combination of a sweep system for supplying a scanning signal of a selected frequency to the cathode ray tube for scanning the beam components, field producing means associated with the cathode ray tube and adapted to produce a field for converging one beam component with respect to another, a circuit for energizing said field producing means including first and second series-tuned circuits coupled to and energized by said sweep system, said first tuned circuit being tuned to the selected frequency and said second tuned circuit being tuned to the second harmonic thereof, and means coupling said first and second tuned circuits to said field producing means for controlling the convergence of the beam components in accordance with the scanned position thereof.

13. In a cathode ray image-reproducing system wherein a plurality of electron beam components, which traverse predeflection paths that are spaced respectively about the longitudinal axis of a tube, are angularly deflected both horizontally and vertically to scan a raster at a target electrode, and having field-producing apparatus adjacent to said predeflection paths and energizable to effect substantial convergence of said beam components at all points of said raster, a system to energize said field-producing apparatus comprising, raster-scanning deflection wave apparatus, means including a first tuned circuit including a coil and a capacitor tuned to the operating frequency of said deflection wave apparatus, said means forming at least part of said beam convergence field-producing apparatus, and means including a second tuned circuit tuned to a frequency substantially higher than the operating frequency of said deflection wave apparatus, and means coupling said first and second tuned circuits to said deflection wave apparatus to develop and apply to said coil field producing appartus substantially parabolic beam convergence wave energy at the operating frequency of said deflection wave apparatus.

14. The combination of claim 11 wherein said resonant network is adapted to develop respective signal components of the predetermined frequency and the second harmonic thereof and said resonant network includes adjustable means for regulating the respective amplitudes of said components.

15. The combination of claim 12 which includes variable means for adjusting the amplitude of signal components developed by said first and second tuned circuits for developing a substantially parabolic wave form in said field producing means.

16. The combination of claim 11 wherein said resonant network includes means for regulating the comparative amplitudes of signal components developed thereby at the predetermined frequency and the second harmonic thereof to a ratio of substantially 4 to 1.

17. In a color television receiver including a cathode ray image reproducing tube having means for developing a plurality of cathode ray beam components and a sweep system for supplying to the cathode ray tube a horizontal deflection field of a predetermined frequency for scanning the cathode ray beam components, a circuit for developing a convergence field for dynamically converging the cathode ray beam components throughout each scanning cycle, said circuit including in combination, field producing means associated with the cathode ray tube adjacent a predeflection path of the beam components for producing a field for dynamically converging such components, and a network coupled to the sweep system and to said field producing means, said network deriving energy from the sweep system and applying signals to said field producing means, said network including inductor and capacitor elements which provide resonance at substantially the predetermined frequency, said network further including means for developing a signal component harmonically related to the predetermined frequency to shape the signals applied to the field producing means to a substantially parabolic wave form.

18. In a color television receiver including a cathode ray image reproducing tube having means for developing a plurality of cathode ray beam components and a sweep system for supplying a horizontal deflection field of a predetermined frequency for scanning the cathode ray beam components, a circuit for developing a convergence field for dynamically converging the cathode ray beam components throughout each scanning cycle, said circuit including in combination, field producing means associated with the cathode ray tube adjacent a pre-deflection path of the beam components for producing a field for dynamically converging such components, and a network coupled to the sweep system and to said field producing means, said network deriving energy from the sweep system and including inductor and capacitor elements which provide resonance to produce a sine wave signal component at substantially the predetermined frequency, said network further including means for developing a signal component of the second harmonic of the predetermined frequency and for applying the sine wave signal component and the second harmonic signal component to said field producing means with such second harmonic signal component so applied having an amplitude substantially less than the amplitude of the sine wave signal component applied, so that said field producing means is energized by a signal of substantially parabolic waveshape.

References Cited in the file of this patent

UNITED STATES PATENTS

| | | |
|---|---|---|
| 2,178,093 | Zworykin et al. | Oct. 31, 1939 |
| 2,572,858 | Harrison | Oct. 30, 1951 |
| 2,623,195 | Best | Dec. 23, 1952 |
| 2,672,574 | Evans | Mar. 16, 1954 |
| 2,707,248 | Goodrich | Apr. 26, 1955 |
| 2,737,609 | Kelly et al. | Mar. 6, 1956 |
| 2,751,519 | Friend | June 19, 1956 |

FOREIGN PATENTS

| | | |
|---|---|---|
| 503,462 | Belgium | June 15, 1951 |